United States Patent [19]
Daniels et al.

[11] Patent Number: 6,041,878
[45] Date of Patent: Mar. 28, 2000

[54] MOLDED WINTERFRONT

[75] Inventors: John A. Daniels, Grayslake; Stephen R. Hardwick, Des Plaines, both of Ill.

[73] Assignee: DFM Corporation, Indianola, Iowa

[21] Appl. No.: 08/960,524

[22] Filed: Oct. 31, 1997

[51] Int. Cl.$^7$ ............................................. B60K 11/04
[52] U.S. Cl. ................................................ 180/68.6
[58] Field of Search .................................. 180/68.6, 274, 180/68.4; 293/132, 115; 296/77.1

[56] References Cited

U.S. PATENT DOCUMENTS

| | | |
|---|---|---|
| Re. 34,907 | 4/1995 | Gross . |
| 1,345,283 | 6/1920 | Thomas . |
| 1,950,792 | 3/1934 | Green . |
| 2,170,524 | 8/1939 | Agerell et al. ........................ 180/68.6 |
| 2,358,486 | 9/1944 | Zeeb ...................................... 180/68.6 |
| 4,143,732 | 3/1979 | Schmude et al. ..................... 180/68.6 |
| 4,523,657 | 6/1985 | Kooyumjian . |
| 4,883,139 | 11/1989 | Gross . |
| 4,916,902 | 4/1990 | Pratt et al. . |

FOREIGN PATENT DOCUMENTS

| | | |
|---|---|---|
| 0 558 384 A1 | 9/1993 | European Pat. Off. . |
| 255149 | 10/1927 | Italy . |
| 2 131 150 | 6/1984 | United Kingdom . |

*Primary Examiner*—Richard M Camby
*Attorney, Agent, or Firm*—Zarley, McKee, Thomte, Voorhees & Sease

[57] ABSTRACT

A winterfront of the present invention is adapted to fit over the radiator grill of a vehicle in order to restrict the flow of cold air through the radiator during cold weather. The winterfront is comprised of a molded ABS plastic cover which fits over the grill of the vehicle. In one embodiment, the winterfront includes a plurality of transverse ribs with apertures formed therebetween for providing the appearance of a radiator grill. In another embodiment, the winterfront has one large aperture formed in the middle portion of the winterfront. The winterfront is adapted to clip onto the radiator grill so that no drilling into the grill or vehicle is required.

10 Claims, 5 Drawing Sheets

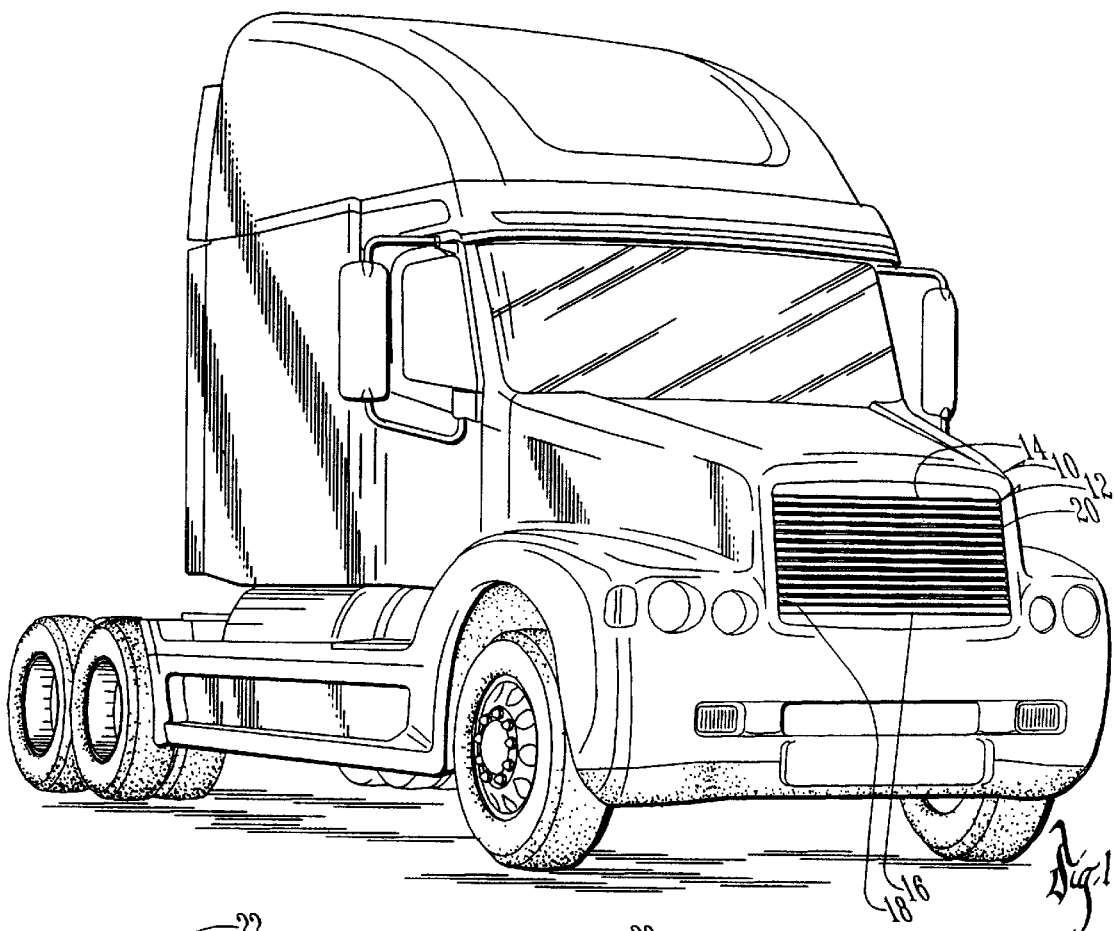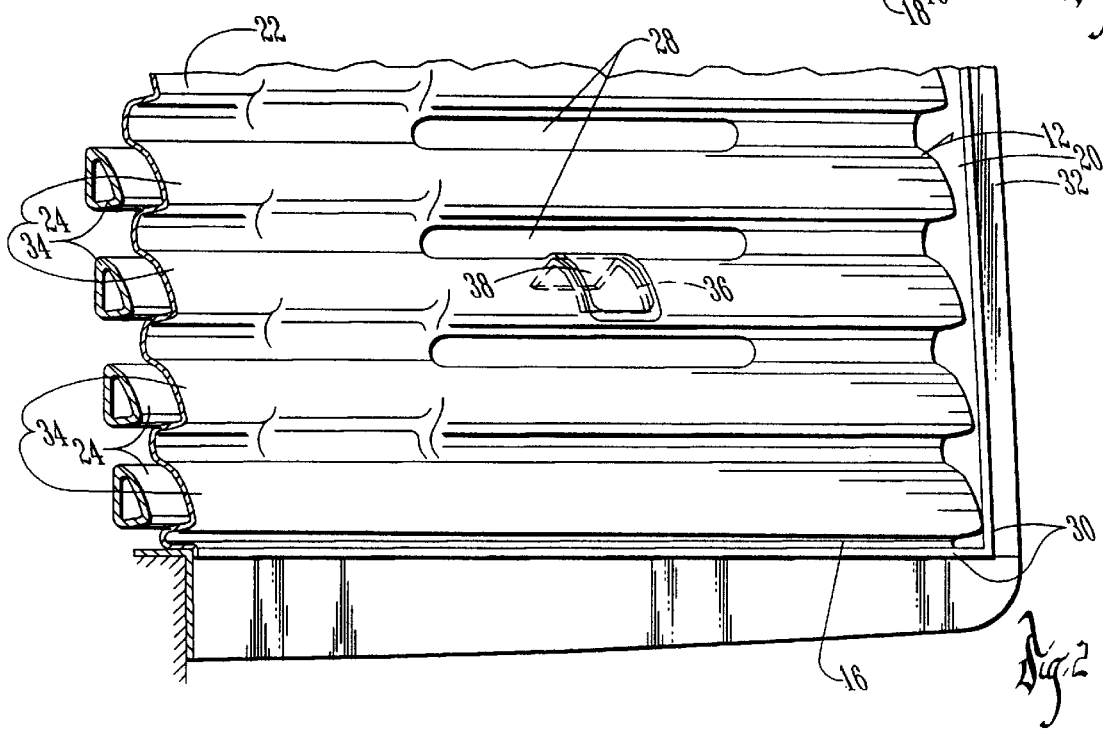

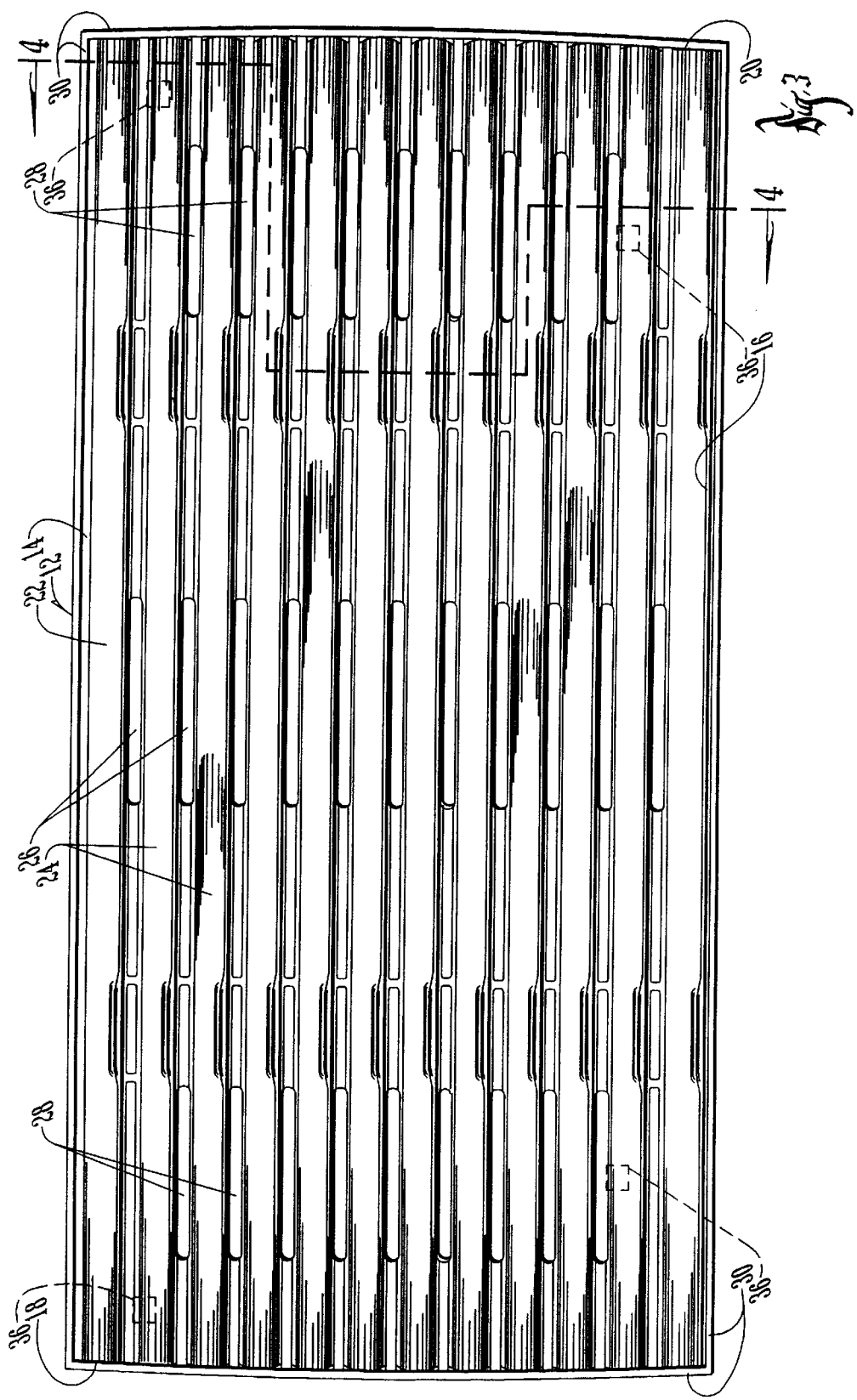

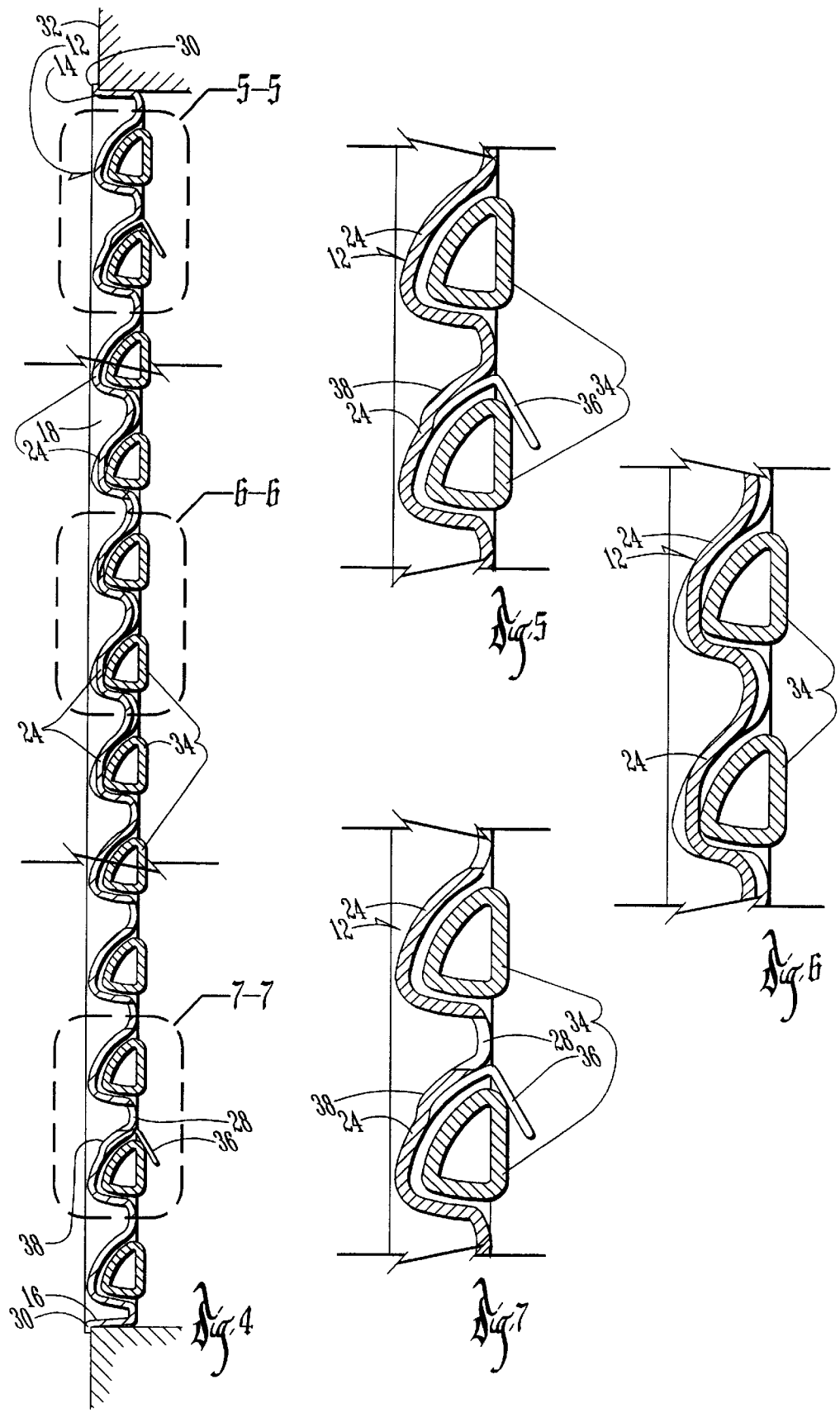

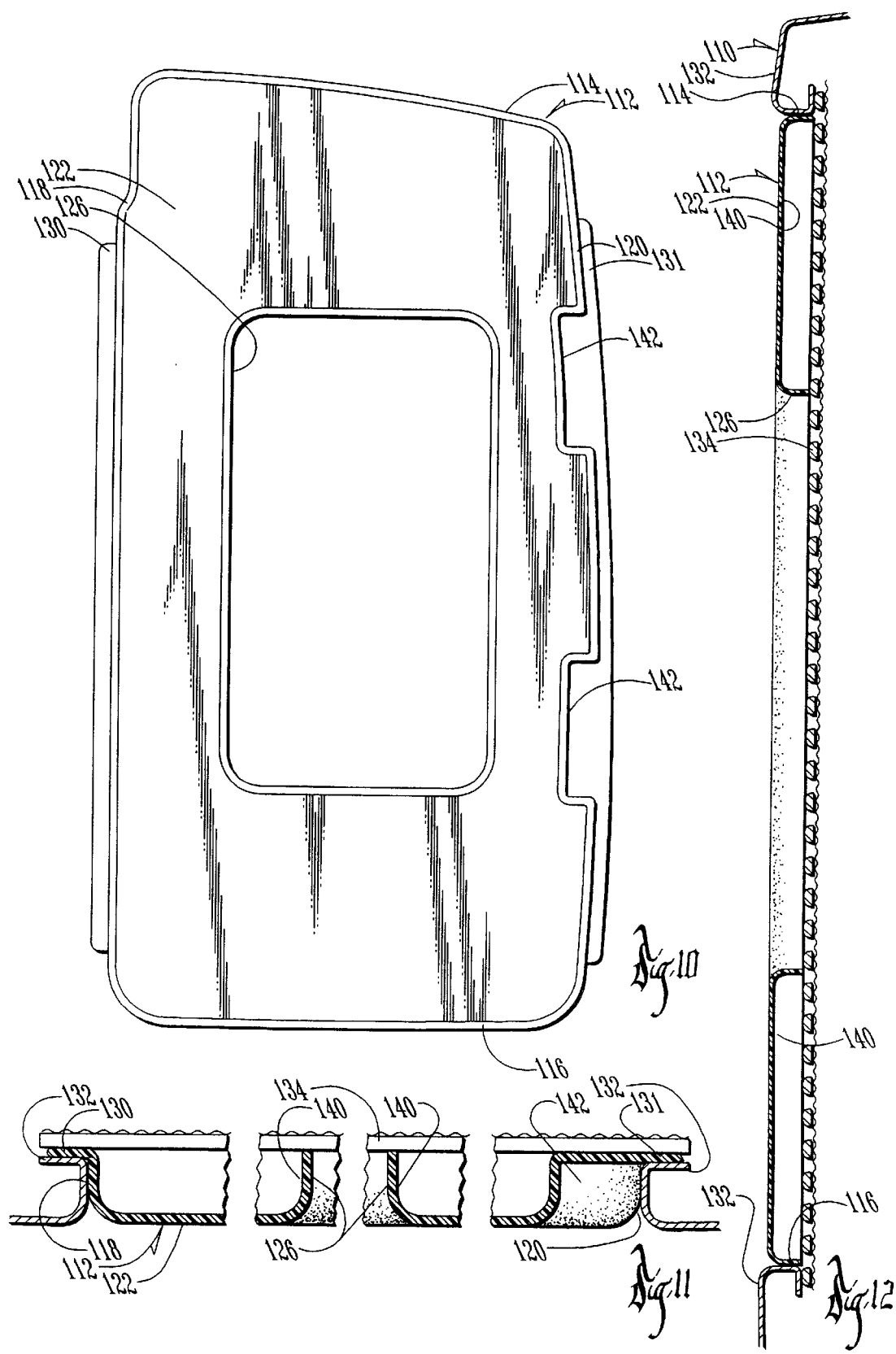

MOLDED WINTERFRONT

BACKGROUND OF THE INVENTION

1. Field of the Invention

The present invention relates to vehicle grill covers. More particularly, though not exclusively, the present invention relates to an apparatus and method for providing an improved winterfront for restricting the amount of airflow to the radiator of a vehicle.

2. Problems in the Art

During cold weather it is desirable to reduce the amount of air flowing through the grill and radiator of a vehicle in order to reduce the cooling effect of the cold air. Winterfronts, or grill covers, for providing this function are well known in the art. A typical prior art winterfront comprises a cloth sheet which attaches over the grill of the vehicle by snaps or turn-button grommets.

While these prior art devices do reduce the amount of cold air flowing through the radiator, the devices have various disadvantages. First, a fabric winterfront is unattractive on a vehicle. Second, a fabric winterfront can rip or come loose and flap during use. Fabric winterfronts also get very dirty and stained and are difficult to clean. In addition, prior art winterfronts require drilling in the vehicle or vehicle grill in order to install the fasteners which hold the winterfront in place.

Therefore, a need can be seen for a method and apparatus for providing an effective grill cover winterfront which overcomes the problem found in the prior art.

FEATURES OF THE INVENTION

A general feature of the present invention is the provision of a method and apparatus for providing a grill cover winterfront which overcomes problems found in the prior art.

A further feature of the present invention is the provision of a method and apparatus for providing a grill cover winterfront including a plastic molded cover which provides the appearance of a vehicle grill.

A further feature of the present invention is the provision of a method an apparatus for providing a grill cover winterfront which can be attached without drilling through the grill or vehicle.

Further features, objects, and advantages of the present invention include:

A method and apparatus for providing a grill cover winterfront which is aesthetically pleasing.

A method and apparatus for providing a grill cover winterfront which includes a plurality of openings for allowing a desired amount of airflow through the radiator.

A method and apparatus for providing a grill cover winterfront which uses a plurality of attachment clips to clip the cover on the vehicle grill.

A method and apparatus for providing a grill cover winterfront which is comprised of rigid thermoformed plastic to form a rigid grill cover.

A method and apparatus for providing a grill cover winterfront which includes a molded cover having a plurality of ribs which conform to the ribs of the grill to give the appearance of the vehicle grill.

A method and apparatus for providing a grill cover winterfront which restricts the flow of air through the grill and radiator of the vehicle while providing a clearance between the cover and the grill.

A method and apparatus for providing a grill cover winterfront which is paintable so that the cover can be painted to match the vehicle.

A method and apparatus for providing a grill cover winterfront which does not require drilling through the vehicle or vehicle grill.

A method and apparatus for providing a grill cover winterfront which is resistant to dirt and stains.

A method and apparatus for providing a grill cover winterfront which is easy to clean.

These as well as other features, objects and advantages of the present invention will become apparent from the following specification and claims.

SUMMARY OF THE INVENTION

The winterfront of the present invention is used to cover the grill of a vehicle in order to restrict the airflow through the radiator during cold weather. The invention is preferably comprised of a molded plastic cover adapted to fit over the grill of the vehicle in an aesthetically pleasing way. In one embodiment, the winterfront grill cover includes a plurality of transverse ribs forming apertures therebetween. Alternatively, the winterfront of the present invention may be substantially flat with a single large aperture formed in a middle portion of the winterfront. The present invention may optionally be secured to the grill of a vehicle by clips or flanges, eliminating any need for drilling into the vehicle or vehicle grill.

BRIEF DESCRIPTION OF THE DRAWINGS

FIG. 1 is a perspective view of a truck using a grill cover of the present invention.

FIG. 2 is an enlarged partial view of the grill cover shown in FIG. 1.

FIG. 3 is an enlarged view of the grill cover shown in FIG. 1.

FIG. 4 is a sectional view taken along line 4—4 of FIG. 3.

FIG. 5 is a partial sectional view taken along line 5—5 of FIG. 4.

FIG. 6 is a partial sectional view taken along line 6—6 of FIG. 5.

FIG. 7 is a partial sectional view taken along line 7—7 of FIG. 6.

FIG. 10 is a front view of the grill cover shown in FIG. 8.

FIG. 11 is a partial sectional view taken along line 11—11 of FIG. 9.

FIG. 12 is a sectional view taken along line 12—12 of FIG. 9.

DETAILED DESCRIPTION OF THE PREFERRED EMBODIMENT

Figure 8:
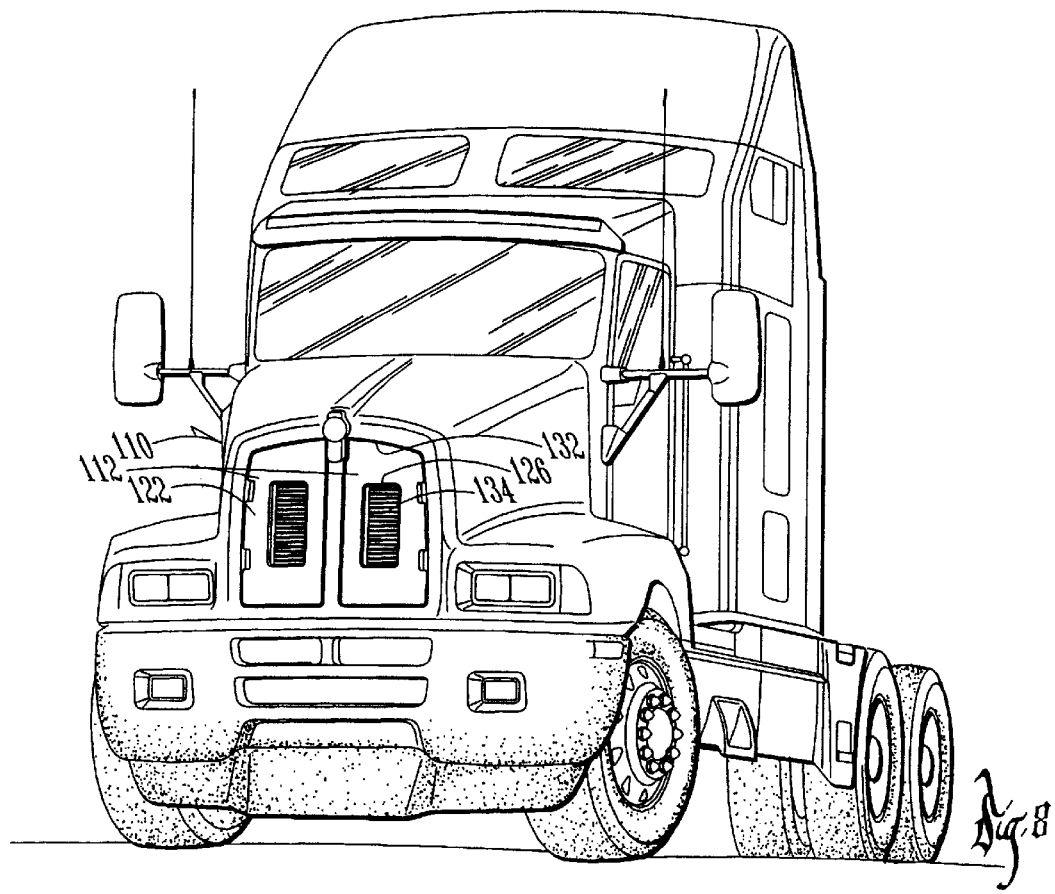
FIG. 8 is a perspective view of a truck and an alternative embodiment of the grill cover of the present invention.

The present invention will be described as it applies to its preferred embodiment. It is not intended that the present invention be limited to the described embodiment. It is intended that the invention cover all alternatives, modifications, and equivalencies which may be included within the spirit and scope of the invention.

FIG. 1 shows a vehicle 10 with a grill cover winterfront 12 of the present invention. While the grill cover 12 can be used with a variety of vehicles, FIG. 1 shows a Freightliner semi tractor.

FIGS. 2–7 show the grill cover winterfront 12 in more detail. As shown in FIGS. 1 and 3, the grill cover 12 is substantially rectangular in shape so that it will closely conform to the shape of the grill of the truck 10. The grill cover 12 includes top and bottom walls or edges 14 and 16, respectively, and opposing side edges 18 and 20. Disposed between the edges 14, 16, 18 and 20 is a middle portion 22. The middle portion 22 is comprised of a plurality of ribs 24 which give the cover 12 the appearance of the truck grill. The ribs 24 are shown in more detail in FIGS. 4–7. Also formed in the middle portion 22 of the grill cover 12 are a plurality of apertures for allowing air to flow through the cover 12 and through the radiator of the vehicle 10. As shown in FIG. 3, the preferred embodiment includes three columns of openings including center openings 26 and outer openings 28. Of course, the number and shape of the openings 26 and 28 can take on many forms and shapes.

FIGS. 2 and 4 show how the grill cover 12 fits to the grill of the truck 10. The grill cover 12 includes a flange 30 formed around the perimeter of the grill cover 12. The grill of the vehicle 10 includes a chrome frame 32. The flange 30 of the grill cover 12 engages the frame 32 forming a snug fit with the vehicle 10. The grill of the vehicle 10 includes a plurality of grill ribs 34 (FIGS. 2–6). As shown, the middle portion 22 of the grill cover 12 closely conforms to the grill ribs 34. In this way, the ribs 24 of the grill cover 12 look like the grill ribs 34 of the actual grill. As a result, the grill cover 12 has the overall appearance of an actual grill.

The grill cover 12 is held in place by a plurality of attachment clips 36 formed on the middle portion 22 of the grill cover 12. In the preferred embodiment, four clips 36 are used, as shown in dashed lines in FIG. 3. As shown in FIG. 5, the attachment clips 36 are attached to a raised area 38 of the ribs 24 and extend downward at an angle to engage the rear side of the grill ribs 34. In order to install the grill cover 12, the grill cover 12 is placed over the grill of the vehicle 10 and snapped on with a downward motion to clip the clips 36 around the respective grill ribs 34. By using the attachment clips 36, the grill cover 12 can be secured to the grill without drilling through the grill or providing any other type of drilled fastener. The attachment clips may be comprised of plastic, metal, or any other suitable material.

FIG. 7 shows an enlarged sectional view of a portion of the grill cover 12 illustrating two of the outer openings 28.

FIGS. 8–12 show an alternate embodiment of the present invention. FIG. 8 shows a vehicle 110, in this example a Kenworth semi tractor. Positioned over the grill of the truck 110 are two grill covers 112 of the present invention.

Figure 9:
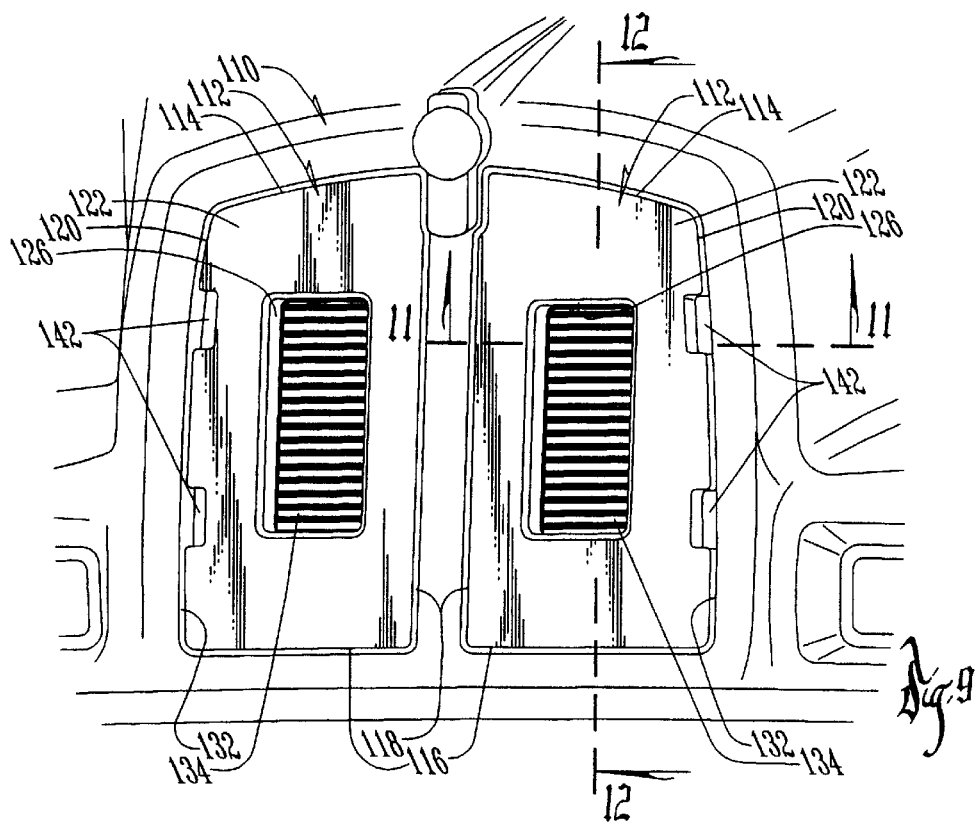
FIG. 9 is an enlarged partial view of the grill cover shown in FIG. 8.

FIG. 9 is an enlarged view showing a pair of grill cover winterfronts 112. FIG. 10 shows one of the grill covers 112. The two grill covers 112 shown in FIGS. 8 and 9 are mirror images of each other and therefore only one will be described. The grill cover 112 includes top and bottom edges 114 and 116, respectively, as well as side edges 118 and 120 (FIG. 10). The grill cover 112 also includes a middle portion 122 which includes one large opening 126 formed therein. Formed on the edges 118 and 120 are flanges 130 and 131. When the cover 112 is installed, the flanges 130 and 131 are inserted between the chrome frame 132 and the grill 134 of the vehicle 110. The middle portion 122 of the grill cover 112 is generally U-shaped as shown best in FIGS. 11 and 12. The U-shaped cross section of the middle portion 122 forms a clearance, or space 140 between the grill cover 122 and the ribs 134 of the grill.

The grill cover 112 also includes a pair of indentions 142 formed in the side edge 120. The indentions 142 provide the user a place to grasp the cover 112 when installed and removing the cover from the truck 10 (discussed below).

The present invention operates as follows. If a user of the present invention uses the grill cover 12 shown in FIGS. 1–7, a single grill cover 12 is used. To install the grill cover 12 onto the grill of the truck 10, the user simply presses the grill cover 12 onto the grill of the vehicle until the clips 36 engage the grill ribs 34 as shown in FIGS. 4, 5 and 7. Once the grill cover 12 is snapped into the position shown, the ribs 24 formed on the middle portion 22 of the grill cover 12 make the grill cover 12 look like the grill of the vehicle 10. The outer openings 28 and center openings 26 formed in the middle portion 22 of the grill cover 12 allow air to flow through the grill of the vehicle 10. The cover 12 can be easily be snapped off when it is not needed.

If the user is using the grill covers 112 shown in FIGS. 8–12, the user grasps the cover 112 using the indentations 142 and inserts the flanges 130 and 131 between the chrome frame 132 and the grill ribs 134. The user then inserts the opposite flange 130 or 131 between the chrome frame 132 and grill ribs 134. The cover 112 can be easily be snapped off when it is not needed.

With either grill cover 12 or 112, the amount of air allowed to flow through the radiator grill is restricted in order to help keep the engine warm in cold weather.

The present invention can be adapted to fit to any type of grill including, but not limited to grills of International, Mack, Volvo, Freightliner, Kenworth, or Western Star trucks. The grill covers of the present invention are preferably made from a rigid, but pliable, thermoformed ABS plastic, although other materials could be used. The ABS plastic is also preferably UV protected for durability. The winterfronts of the present invention are preferably paintable so they can be painted to match the color of the truck. The winterfronts of the present invention are also resistant to dirt and stains. The winterfronts can be easily cleaned with a cloth or by spraying the winterfront with water.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A vehicle grill cover adapted to fit over a grill having a generally rectangular shape with a plurality of transverse ribs extending across the grill, the grill cover comprising:

a cover member having a perimeter and a middle portion within the perimeter, the middle portion having a plurality of transverse ribs corresponding to the transverse ribs of the vehicle grill such that when the cover member is fit over the grill, the transverse ribs of the cover member conform to the shape of the transverse ribs of the grill; and at least one aperture formed in the middle portion of the cover member to allow air to flow through the vehicle grill.

2. The grill cover of claim 1, further comprising a plurality of clips secured to the cover member for securing the cover member to the grill of the vehicle.

3. The grill cover of claim 1, wherein the aperture is formed between two adjacent transverse ribs of the cover member.

4. The grill cover of claim 1, wherein the at least one aperture is comprised of a plurality of apertures.

5. The grill cover of claim 1, further comprising a flange formed around the perimeter of the cover member to engage the grill of the vehicle.

6. The grill cover of claim 1, wherein the cover member is comprised of ABS plastic.

7. A method of restricting the airflow through the radiator of a vehicle comprising the steps of:

providing a rigid grill cover adapted to fit over the grill of the vehicle;

forming a plurality of transverse ribs on the grill cover to give the appearance that the grill cover is the grill of the vehicle;

forming at least one aperture in the grill cover; and placing the rigid grill cover over the grill of the vehicle such that the grill cover will restrict the flow of air through the radiator while still allowing air flow to the radiator through the aperture.

8. The method of claim 7, further comprising the steps of:

providing clips secured to the grill cover; and securing the grill cover to the grill of the vehicle by clipping the clips to the grill of the vehicle.

9. A grill cover for use with a vehicle having a radiator and a radiator grill comprising:

a frame generally in a rectangular shape having a top wall, a bottom wall, and two opposing side walls; and a plurality of transverse ribs between said side walls forming apertures therebetween, said ribs conforming to the shape of the radiator grill.

10. The grill cover of claim 9, further comprising a plurality of clips attached to the grill cover for securing the grill cover to the radiator grill.

\* \* \* \* \*